US012612922B2

(12) United States Patent
Cipriani et al.

(10) Patent No.: US 12,612,922 B2
(45) Date of Patent: Apr. 28, 2026

(54) SEALING GAS LEAKAGE RECOVERY AND SEALING GAS BOOSTING SYSTEM AND METHOD

(71) Applicant: NUOVO PIGNONE TECNOLOGIE—S.R.L., Florence (IT)

(72) Inventors: Sergio Cipriani, Florence (IT); Simone Bassani, Florence (IT); Riccardo Bagagli, Florence (IT)

(73) Assignee: Nuovo Pignone Tecnologie—S.r.l., Florence (IT)

( * ) Notice: Subject to any disclaimer, the term of this patent is extended or adjusted under 35 U.S.C. 154(b) by 162 days.

(21) Appl. No.: 18/254,819

(22) PCT Filed: Nov. 26, 2021

(86) PCT No.: PCT/EP2021/025466
§ 371 (c)(1),
(2) Date: May 26, 2023

(87) PCT Pub. No.: WO2022/117227
PCT Pub. Date: Jun. 9, 2022

(65) Prior Publication Data
US 2024/0026893 A1 Jan. 25, 2024

(30) Foreign Application Priority Data

Dec. 3, 2020 (IT) ........................ 102020000029783

(51) Int. Cl.
*F04D 29/10* (2006.01)
*F04D 17/10* (2006.01)
(Continued)

(52) U.S. Cl.
CPC ........... *F04D 29/102* (2013.01); *F04D 17/10* (2013.01); *F04D 25/02* (2013.01); *F04D 29/124* (2013.01); *F16J 15/34* (2013.01); *F16J 15/406* (2013.01)

(58) Field of Classification Search
CPC ........ F01D 11/04; F04D 29/102; F04D 17/10; F04D 25/02; F04D 29/124; F16J 15/406
See application file for complete search history.

(56) References Cited

U.S. PATENT DOCUMENTS

| | | | |
|---|---|---|---|
| 6,345,954 B1 * | 2/2002 | Al-Himyary | ........ F16J 15/3404 |
| | | | 415/230 |
| 6,931,983 B2 * | 8/2005 | Meucci | .................. F04B 31/00 |
| | | | 417/418 |
| 2018/0223856 A1 | 8/2018 | Gallinelli et al. | |

FOREIGN PATENT DOCUMENTS

| | | |
|---|---|---|
| CA | 2075604 A1 | 2/1994 |
| CN | 102066766 A | 5/2011 |

(Continued)

OTHER PUBLICATIONS

Pugnet, J. M., et al., "Influence des etancheites sur le comportement vibratoire des compresseurs centrifuges", Feb. 1, 1992.

(Continued)

*Primary Examiner* — Sabbir Hasan
(74) *Attorney, Agent, or Firm* — Paul Frank + Collins P.C.

(57) ABSTRACT

The compressor arrangement comprises a main compressor having a suction side, a delivery side, and at least one dry gas seal. The dry gas seal is fluidly coupled to a sealing gas feed circuit adapted to receive sealing gas from the delivery side of the main compressor and feed the sealing gas to the at least one dry gas seal. An auxiliary compressor unit is further provided, including a sealing gas inlet fluidly coupled to the sealing gas feed circuit, and a sealing gas (Continued)

outlet fluidly coupled to the sealing gas feed circuit and adapted to booster the sealing gas pressure in the sealing gas feed circuit. The auxiliary compressor unit is further adapted to receive a gas flow from the main compressor, for instance a primary vent from the dry gas seal for recovery purposes.

19 Claims, 6 Drawing Sheets

(51) Int. Cl.

| | |
|---|---|
| *F04D 25/02* | (2006.01) |
| *F04D 29/12* | (2006.01) |
| *F16J 15/34* | (2006.01) |
| *F16J 15/40* | (2006.01) |

(56) References Cited

FOREIGN PATENT DOCUMENTS

| | | | |
|---|---|---|---|
| CN | 102713306 | A | 10/2012 |
| DE | 4216006 | C1 | 4/1993 |
| EP | 1420167 | A1 | 11/2003 |
| EP | 1420167 | A2 | 5/2004 |
| JP | S6018293 | U | 2/1985 |
| JP | 2004162714 | A | 6/2004 |
| WO | 97/01053 | A1 | 1/1997 |
| WO | 2011/061142 | A1 | 5/2011 |

OTHER PUBLICATIONS

Tchigique, B , "Garnitures Gaz Philosophie D. instrumentation", Association Francaise des Techniciens du Petrol, Paris, FR, No. 370, Feb. 1, 1992, p. 42-47, ISSN: 0152-5425, Feb. 1, 1992.

* cited by examiner

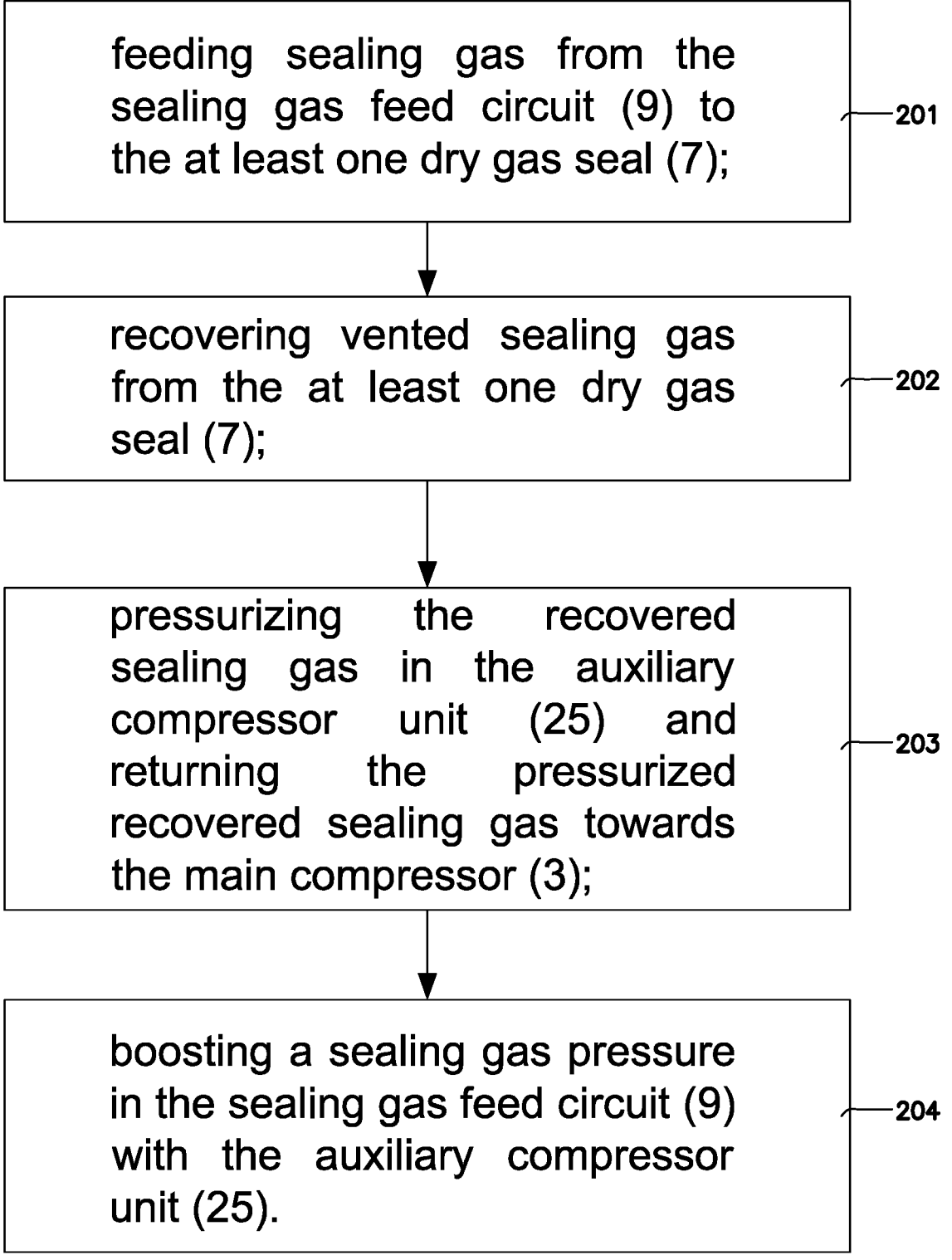

feeding sealing gas from the sealing gas feed circuit (9) to the at least one dry gas seal (7);          —201 recovering vented sealing gas from the at least one dry gas seal (7);          —202 pressurizing the recovered sealing gas in the auxiliary compressor unit (25) and returning the pressurized recovered sealing gas towards the main compressor (3);          —203 boosting a sealing gas pressure in the sealing gas feed circuit (9) with the auxiliary compressor unit (25).          —204

Fig.5 feeding sealing gas from the sealing gas feed circuit (9) to the at least one dry gas seal (7);  —301 boosting a sealing gas pressure in the sealing gas feed circuit (9) with the auxiliary compressor unit (25);  —302 upon shut-down of the compressor unit, removing process gas from the main compressor (3) with the auxiliary compressor unit (25).  —303

SEALING GAS LEAKAGE RECOVERY AND SEALING GAS BOOSTING SYSTEM AND METHOD

TECHNICAL FIELD

The subject-matter disclosed herein relates to gas compressor arrangements comprising dry gas seals, and to methods for operating such arrangements.

BACKGROUND ART

Fossil fuels are still a major source of energy for the production of thermal power required in several industrial processes, including electric power generation. Attempts have been made to reduce the environmental impact of this energy resource. The cleanest fossil fuel is natural gas, mainly consisting in methane, since combustion of methane generates more thermal energy by mass than any other hydrocarbon, providing a great environmental benefit, as it produces remarkably less carbon dioxide and other pollutants that contribute to the environmental impact.

Nevertheless, extracting and transporting natural gas cause release of unburnt gas, mainly methane, in the atmosphere. This has severe implications in terms of environmental impact, since methane contributes to climate changes and in particular has a greenhouse effect. As a matter of fact, just as carbon dioxide, also methane traps heat in the atmosphere. The global warming potential (GWP), a measure of how much heat a greenhouse gas traps in the atmosphere up to a specific time horizon, of methane in a span of 100 years is about 28 times higher than that of carbon dioxide.

Efforts have therefore been made to reduce the amount of natural gas released in the atmosphere in the whole process of natural gas extraction, transportation and use.

A main role in this approach is played by rotary seals of gas compressors. Dry gas seals have become increasingly popular as non-contact seals to efficiently reduce leakages of process gas from centrifugal compressors or other turbomachines (Stahley, John S. "*Dry Gas Seals Handbook*", Copyright 2005 by PennWell Corporation, ISBN 1-59370-062-8). Dry gas seals use a flow of process gas to provide efficient non-contact sealing between a rotary shaft and a stationary seal. Dry gas seals require a flow of clean, dry gas to operate. Usually, the same gas processed by the compressor is used as sealing gas. Sealing gas is taken from the delivery side of the compressor and the compressor shall be operative to provide sufficiently pressurized sealing gas.

In compressors for processing natural gas, for instance in gas pipelines, the natural gas leakages from the dry gas seals are usually burnt in a flare, which avoids discharging natural gas in the atmosphere, but which anyhow produces greenhouse gas (carbon dioxide) and destroys an amount of valuable feedstock.

It has therefore been suggested to recover gas leaking from dry gas seals. Circuits for hydrocarbon recovery in centrifugal compressor systems using dry gas seals are disclosed in Sergio Cipriani et al: "*Turbomachinery Hydrocarbon Loss recovery Systems*", a paper presented at the Gas Turbines for Energy Network Symposium, Banff, Alberta, Canada, October 2019.

Even though they are particularly effective in providing efficient sealing of rotary machines, dry gas seals require a complex support system, which negatively affects the cost of the compressor arrangements using such kind of seals. Among other functions, the support system shall provide pressurized sealing gas also when the compressor is at standstill or at compressor start-up, i.e. when the compressor itself is unable to provide sufficiently pressurized sealing gas.

The need for special measures aimed at reducing the release of process gas in the atmosphere, as those mentioned above, adds to the complexity of the support system.

Compressors, such as centrifugal compressors in gas pipelines, require maintenance and other interventions. Before opening the compressor for maintenance or other purposes, the process gas contained therein must be removed. The gas contained in the compressor after shutdown is often discharged in the atmosphere before opening the compressor. This represents a loss of hydrocarbons and also has a negative environmental impact.

It would therefore be beneficial to simplify the dry gas seal support systems, while maintaining sealing efficiency and reduction of contaminants release in the atmosphere.

SUMMARY

According to one aspect, a compressor arrangement is disclosed, comprising a main compressor having a suction side, a delivery side, and at least one dry gas seal. The main compressor further includes a sealing gas feed circuit adapted to receive sealing gas from the delivery side of the main compressor and feed the sealing gas to the dry gas seal(s).

In embodiments disclosed herein, the compressor arrangement further comprises an auxiliary compressor unit including a sealing gas inlet and a sealing gas outlet fluidly coupled to the sealing gas feed circuit. The auxiliary compressor unit is adapted to perform a sealing gas pressure boosting function, when insufficient or no gas pressure is available at the delivery side of the main compressor, e.g. during standstill of the main compressor, or during start-up and shut-down transients.

The auxiliary compressor unit is adapted to receive sealing gas from the sealing gas feed circuit through the sealing gas inlet at a sealing gas inlet pressure, and return the sealing gas to the sealing gas feed circuit at a sealing gas outlet pressure, higher than the sealing gas inlet pressure.

In embodiments disclosed herein, the auxiliary compressor unit is further adapted to receive a gas flow from the main compressor and process said gas flow. The gas flow may include sealing gas vented from the dry gas seals of the main compressor. The auxiliary compressor unit is therefore configured to recover the vented sealing gas, avoiding release of the vented sealing gas in the environment or burning of the vented sealing gas in a flare.

An additional duct can be provided, adapted to receive a gas flow from the main compressor. In some embodiments, in addition to or instead of vented sealing gas from the dry gas seals, the gas flow from the main compressor may include process gas removed from the main compressor following compressor shut-down, to allow opening of the main compressor without process gas release in the environment.

Further advantageous features and embodiments of the compressor arrangement and relevant methods of operation are outlined here below.

BRIEF DESCRIPTION OF THE DRAWINGS

Reference is now made briefly to the accompanying drawings, in which:

3                                                                                              4

FIGS. 5 and 6 illustrate flowcharts of methods for operating a compressor arrangement according to the present disclosure.

DETAILED DESCRIPTION

According to embodiments disclosed herein, a compressor arrangement includes at least one main compressor having one or more dry gas seals. Gas processed by the main compressor is used as sealing gas for the dry gas seals. Sealing gas is fed to each dry gas seal by a sealing gas feed circuit. A sealing gas vent recovery system is fluidly coupled to primary vents of the dry gas seals. The sealing gas recovery system includes an auxiliary compressor aimed at pressurizing the sealing gas leaking from the dry gas seals from a lower pressure to a pressure value adapted for injecting the recovered sealing gas in the sealing gas feed circuit or in the suction side of the main compressor.

The auxiliary compressor is further used to boost the pressure of the sealing gas in the sealing gas feed circuit in case of main compressor shut down, as well as during shut-down or start-up transients. This prevents fouling of the dry gas seals during compressor standstill and transients, when no or insufficient gas pressure at the main compressor delivery side is available. By using the same auxiliary compressor for recovering the primary vents of the dry gas seals and boosting the pressure of the sealing gas during compressor standstill or re-start/shut-down transients significantly reduces the complexity of the compressor arrangement, and specifically of the support system for the dry gas seals.

According to further embodiments disclosed herein, a compressor arrangement includes at least one main compressor having one or more dry gas seals. Gas processed by the main compressor is used as sealing gas for the dry gas seals. Sealing gas is fed to each dry gas seal by a sealing gas feed circuit. An auxiliary compressor is provided, aimed at boosting the pressure in the sealing gas feed circuit in case of main compressor shut-down or during start-up/shut-down transients, when insufficient or no pressure is available at the delivery side of the main compressor. This prevents fouling of the dry gas seals also during standstill and transients of the main compressor. The same auxiliary compressor is also adapted to remove process gas from the main compressor following shut-down thereof and prior to opening the main compressor, e.g. for maintenance purposes or the like. By using the same auxiliary compressor for boosting the sealing gas pressure during compressor standstill or during re-start/shut-down transients, as well as for evacuating the process gas from the main compressor upon shut-down thereof, significantly reduces the complexity of the compressor arrangement, and specifically of the support system for the dry gas seals.

Figure 1:
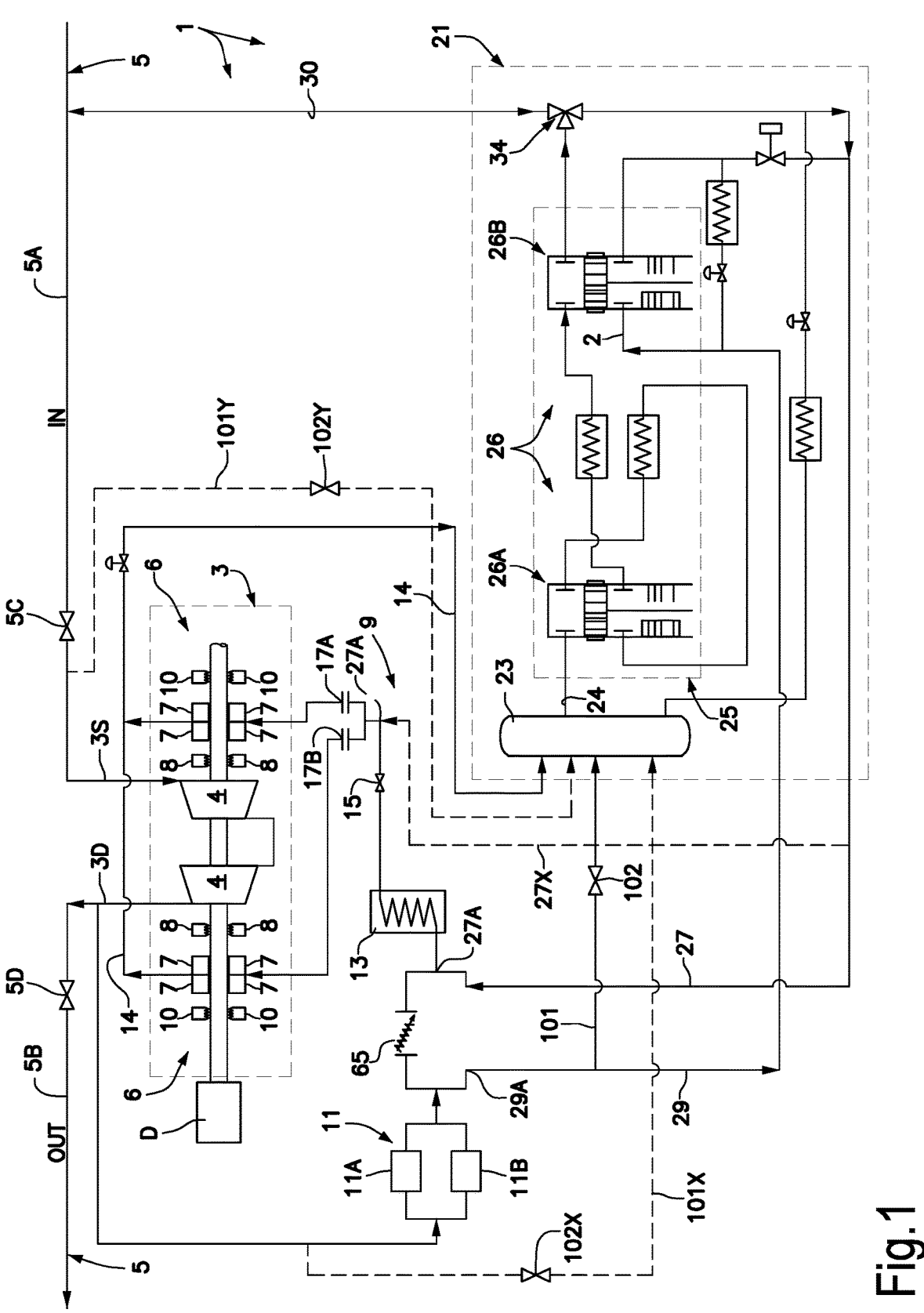
FIG. 1 illustrates a simplified schematic of a compressor arrangement according to the present disclosure.
Figure 2:
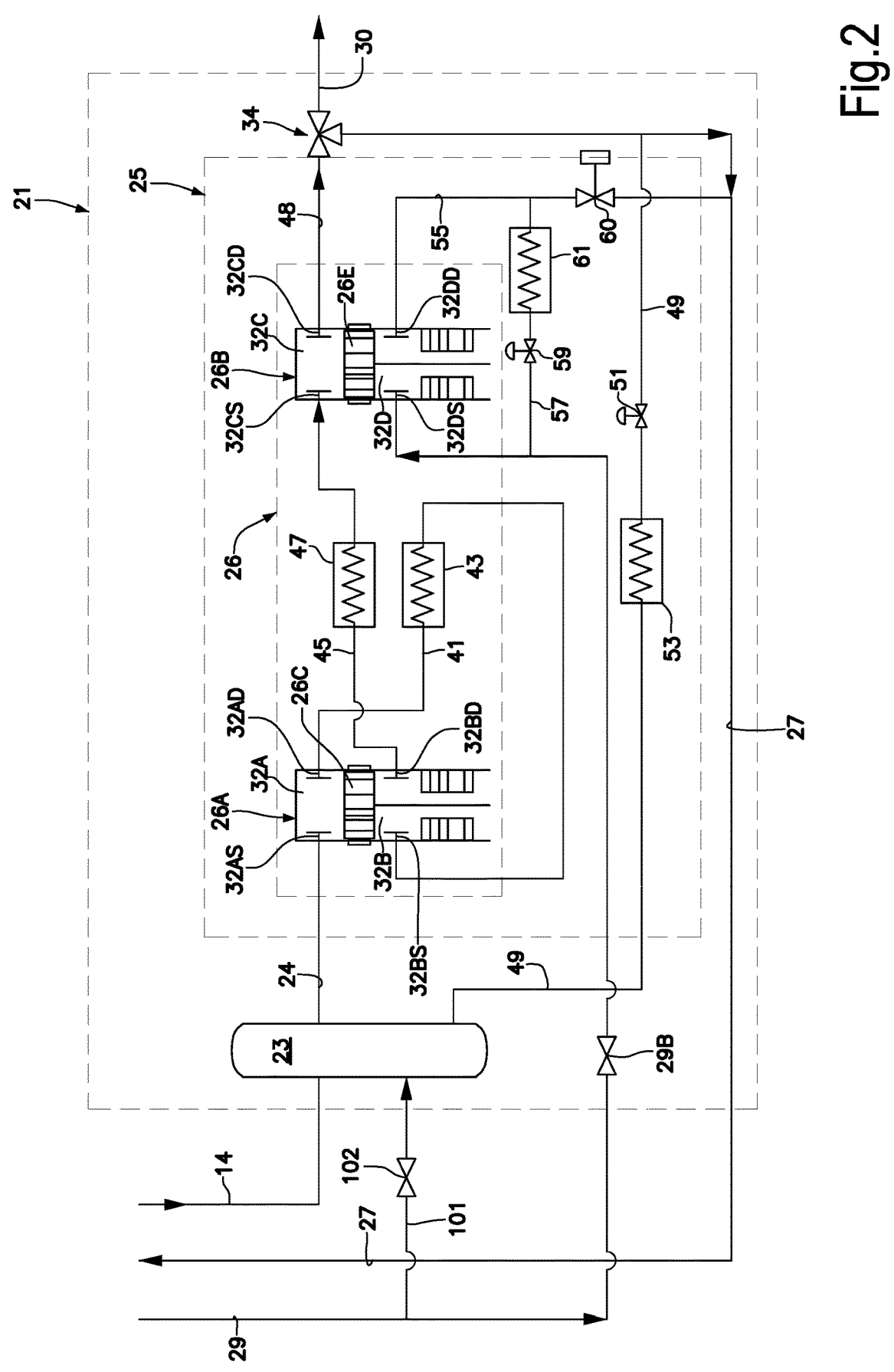
FIG. 2 illustrates a diagram of the auxiliary compressor unit in one embodiment.

Referring now to the drawings, FIG. 1 illustrates schematic of a compressor arrangement 1 according to one embodiment. FIG. 2 illustrates an enlargement of the sealing gas vent recovery system of FIG. 1.

The compressor arrangement 1 comprises a main compressor 3 having a suction side 3S and a delivery side 3D.

The main compressor 3 may be part of a compressor train (not shown) including one or more compressors along a common shaft line. A driver, such as an electric motor, a gas turbine engine, a steam turbine, or the like (schematically shown at D in FIG. 1), drives the main compressor 3 into rotation. The main compressor 3 is fluidly coupled to a piping system 5, including an inlet duct 5A and an outlet duct 5B. Process gas at a first, low pressure, is fed through the inlet duct 5A to the suction side 3S of the main compressor 3. Process gas at a second, higher pressure, is delivered through the delivery side 3D of the main compressor 3 to the outlet duct 5B of the piping system 5. Isolation valves 5C and 5D can be arranged along the inlet duct 5A and the outlet duct 5B, respectively. The isolation valves 5C, 5D can be closed to isolate the main compressor 3 from the piping system 5, e.g. for maintenance, repairing or replacement purposes.

In the embodiment of FIG. 1, the main compressor 3 is an in-between bearings centrifugal compressor, having one or more impellers 4 and two sealing arrangements 6, one at the drive end and one at the non-drive end of the main compressor 3. In other embodiments, not shown, the main compressor may have just one sealing arrangement 6, e.g. when the main compressor has an overhung configuration. In the schematic representation of FIG. 1, each sealing arrangement 6 comprises a dry gas seal 7, an inboard labyrinth seal 8 and an outboard barrier seal 10 arranged between the dry gas seal 7 and the respective bearing (not shown).

The dry gas seals 7 are fluidly coupled to a sealing gas feed circuit 9, adapted to receive process gas from the piping system 5 and to treat and feed the process gas as sealing gas to the dry gas seals 7. Prior to be delivered to the dry gas seals 7, the process gas is suitably filtered and heated. Filters are schematically shown at 11 and a heater is schematically shown at 13. Filters 11 and heater 13 are aimed at removing contaminants from the process gas and at bringing the sealing gas at a temperature above the dew point, to prevent moisture condensation. The position of the filters 11 and of the heater 13 along the sealing gas feed circuit 9 can be reversed.

In the embodiment of FIG. 1, by way of example, the filters 11 include two filter members 11A, 11B in parallel, in a duplex configuration. Between the heater 13 and the dry gas seals 7 a pressure control valve 15 is arranged, along with orifices 17A and 17B downstream of the pressure control valve 15 to balance the sealing gas flow towards the two dry gas seals 7. The above configuration is by way of example only, and those skilled in the art will understand that different configurations are possible. For instance, the heater 13 may be omitted. Moreover, the sequence of the filters and heater may be different. Orifices 17A, 17B and valve 15 may be replaced by two valves in parallel.

The sealing gas feed circuit 9 is fluidly coupled to the piping system 5 downstream of the main compressor 3, i.e. to the outlet duct 5B, such that the process gas at the deliver pressure of main compressor 3 enters the sealing gas feed circuit 9.

Part of the sealing gas delivered to the dry gas seals 7 leaks at substantially ambient pressure, e.g. between 1 and 1.5 barA, through primary and secondary vents. As used in the art, the measurement unit barA indicates the absolute pressure measured in bar. To prevent the vented sealing gas from being discharged in the environment, the compressor arrangement 1 comprises a sealing gas vent recovery system 21, adapted to recover at least the primary vent from the dry gas seals 7 through a primary vent recovery duct 14. The sealing gas vent recovery system 21 shown in FIG. 1 schematically comprises an accumulation volume 23, which is fluidly coupled to the dry gas seals 7 to collect sealing gas venting therefrom. The accumulation volume 23 can be adapted to collect further leakages at nearly ambient pressure from other components of the compressor arrangement 1, such as valve actuators exhaust, gas turbine fuel gas warm-up exhaust, pneumatic gas turbine starter exhaust, and the like, not shown, or seal vents from the rod packing rings of the rods of the reciprocating compressor (to be described).

While in the embodiment shown in the attached drawings the accumulation volume 23 is represented as a dedicated component, it shall be noted that the flowrates involved are so small that the accumulation volume 23 may consists also of just the inner volume of one or more connecting ducts or pipes.

The sealing gas vent recovery system 21 further comprises an auxiliary compressor unit schematically shown at 25, fluidly coupled to the accumulation volume 23 through a first gas inlet 24, and further fluidly coupled to the sealing gas feed circuit 9 and optionally to the suction side 3S of the main compressor 3, in a manner to be described. A more detailed representation of the sealing gas vent recovery system 21 and the auxiliary compressor unit 25 is shown in FIG. 2.

The auxiliary compressor unit 25 includes an auxiliary compressor 26. The auxiliary compressor 26 can include a reciprocating compressor. The auxiliary compressor 26 may include a plurality of stages and a plurality of cylinders.

In some embodiments, the accumulation volume 23 may be embedded inside the auxiliary compressor 26, i.e. it may be part of this latter.

In the schematic of FIGS. 1 and 2, the reciprocating compressor 26 is a two-cylinder reciprocating compressor including a first cylinder 26A and a second cylinder 26B. Each cylinder comprises a piston reciprocating in the cylinder.

The reciprocating compressor 26 is a double-acting reciprocating compressor, wherein each cylinder is divided by the respective piston into two compression chambers, in which process gas is alternatively sucked, compressed and discharged. As will become apparent from the following description, the two chambers of each cylinder can be arranged in series or in parallel, and can form part of one and the same compressor stage, or may belong to two different compressor stages, usually arranged in series.

During normal operation of the main compressor 3, a flow of pressurized gas from the delivery side 3D of the main compressor 3 enters the sealing gas feed circuit 9 and is treated (filtered and heated) prior to be fed as sealing gas to the dry gas seals 7 of the main compressor 3. Most of the sealing gas delivered to the dry gas seals 7 flows through labyrinth seals 8 in the main compressor 3 and is processed along with the main flow of process gas entering the suction side 3S of the main compressor 3. A fraction (usually between about 5% and about 10%) of the sealing gas leaks from dry gas seals 7 and is collected at nearly ambient pressure, in general at a pressure between about 1 barA and about 2 barA, in the accumulation volume 23, wherefrom the leaked sealing gas (primary vent) is recovered and pressurized through the auxiliary compressor unit 25, and returned to the sealing gas feeding circuit 9 and/or to the suction side 3S of the main compressor 3. The above-mentioned pressure values are by way of example and shall not be considered as limiting the scope of the present disclosure. Lower or higher pressure values are possible, e.g. around 4.5 barA.

More specifically, as will be described in more detail below, the auxiliary compressor unit 25 is adapted to pressurize sealing gas leaking from the dry gas seals 7 and collected in the accumulation volume 23, from nearly ambient pressure to a pressure adapted to feed the recovered sealing gas into the sealing gas feed circuit or in the suction side 3S of the main compressor 3, i.e. at a pressure substantially above the pressure inside the accumulation volume 23.

Low-pressure sealing gas enters the auxiliary compressor unit 25 from the accumulation volume 23 through the first gas inlet 24 and is returned to the sealing gas feed circuit 9 through an outlet line 27 or 27X. Reference 27A designates the point of connection between the sealing gas feed circuit 9 and the outlet line 27 (or 27X). Alternatively, or in combination thereto, recovered sealing gas vented from the dry gas seals 7 can be returned to the inlet duct 5A of the piping system 5 through a connection line 30. In some embodiments, a valve system 34 can be associated to lines 27 and 30, to divert the recovered sealing gas selectively towards the piping system 5 through connection line 30, or towards the sealing gas feed circuit 9 through outlet line 27. In FIGS. 1 and 2 the valve system 34 comprises a three-way valve.

The auxiliary compressor unit 25 is further fluidly coupled to the sealing gas feed circuit 9 through a second gas inlet 29 for the purposes explained below.

When the main compressor 3 is at a standstill or during shut-down or re-start transients, there is no flow of pressurized process gas at the delivery side 3D of the main compressor 3, wherefrom sealing gas can be taken. However, in order to prevent fouling of the dry gas seals 7 and possible damages thereof when the main compressor 3 will be started again, a sealing gas flow must be maintained also during standstill of the main compressor 3 or during shut-down or re-start transients.

To provide a continuous flow of sealing gas, the auxiliary compressor unit is fluidly coupled to the sealing gas feed circuit 9 through the above-mentioned second gas inlet 29. Process gas is extracted from the piping system 5 downstream the main compressor 3 through the sealing gas feed circuit 9, fed to the auxiliary compressor unit 25 through the second gas inlet 29 and delivered back to the sealing gas feed circuit 9 at a higher pressure through outlet line 27 (or 27X) and delivered to the dry gas seals 7.

The same auxiliary compressor unit 25 provides therefore a double function: recovering sealing gas leaking from the dry gas seals 7 (primary vent); and boosting the pressure of the sealing gas during standstill of the main compressor 3 and/or during shut-down and re-start transients, thus providing a continuous flow of sealing gas to the dry gas seals 7.

FIG. 2 illustrates more details on the configuration of the auxiliary compressor unit 25 and of the fluid connections between the auxiliary compressor unit 25 and the sealing gas feed circuit 9.

The first cylinder 26A of the auxiliary reciprocating compressor 26 includes a first piston 26C, which reciprocates in the cylinder 26A. The second cylinder 26B includes a second piston 26E, which reciprocates in the cylinder 26B. A single crankshaft rotatingly supported in a crankcase, not shown, drivingly connects the two pistons 26C and 26E to a driver, such as an electric motor, for instance, not shown.

The first piston 26C divides the first cylinder 26A into a first compression chamber 32A and a second compression chamber 32B. The second piston 26E divides the second cylinder 26B into a third compression chamber 32C and a fourth compression chamber 32D. The suction and delivery sides of each chamber 32A, 32B, 32C, 32D are referred to with the same reference number of the chamber followed by the letter "S" for the suction side and by the letter "D" for the delivery side. Thus, for instance, references 32CS and 32CD indicate the suction side and delivery side of chamber 32C. Chambers 32A, 32B and 32C are arranged in series and represent three stages of the reciprocating compressor 26, adapted to compress the recovered sealing gas vented from the dry gas seals 7. The fourth chamber 32D is used for boosting the sealing gas pressure during standstill or start-up and shut-down transients of the main compressor 3 as will be described in more detail later on.

The accumulation volume 23 is fluidly coupled through the first gas inlet 24 with the suction side 32AS of the first chamber 32A of the first cylinder 26A. The delivery side 32AD of the first chamber 32A is in fluid connection with the suction side 32BS of the second chamber 32B. An intercooler 43 can be arranged along a line 41 which fluidly connects the delivery side 32AD of chamber 32A and the suction side 32BS of chamber 32B to one another. The delivery side 32BD of the second chamber 32B is fluidly coupled with the suction side 32CS of the third chamber 32C via a delivery duct 45, along which a further intercooler 47 can be arranged.

In the embodiment of FIG. 2, the suction side 32DS of the fourth chamber 32D is fluidly coupled to the second gas inlet 29 of the auxiliary compressor unit 25.

As will become apparent from the following description of the operation of the auxiliary compressor unit 25, the first chamber 32A, the second chamber 32B and third chamber 32C configure an auxiliary compressor section adapted to pressurize vented sealing gas from the accumulation volume 23, while the fourth chamber 32D configures an auxiliary compressor section adapted to boost the pressure of sealing gas when the main compressor 3 is at standstill or during start-up or shut-down transients thereof.

As shown in FIG. 2, the delivery side 32CD of the third chamber 32C is fluidly coupled through a delivery duct 48 to the outlet line 27 and therefore with the sealing gas feed circuit 9. In embodiments, when a fluid connection between the auxiliary compressor unit 25 and the suction side 3S of the main compressor 3 is provided, such as through line 30, the delivery duct 48 can be fluidly coupled to the suction side 3S of the main compressor 3 instead of to the sealing gas feed circuit 9 via valve system 34 as mentioned above In embodiments, as shown in FIG. 2, a return line 49, including a pressure control valve 51, fluidly couples the delivery side 32CD of the third chamber 32C with the accumulation volume 23, such that sealing gas pressurized by the auxiliary compressor unit 25 can be returned to the accumulation volume 23 if the output flowrate of the auxiliary compressor unit 25 is higher than the sealing gas required by the dry gas seals through the sealing gas feed circuit 9. A cooler 53 can be positioned along the return line 49 to prevent overheating of the gas collected in the accumulation volume 23.

The delivery side 32DD of the fourth chamber 32D is coupled via a duct 55 to the outlet line 27, such that sealing gas processed through the fourth chamber 32D can be fed to the dry gas seals 7, as described in detail later on.

In some embodiments, a recycle line 57 can be provided in anti-parallel with the fourth chamber 32D, such that gas processed in the fourth chamber 32D can be circulated in a closed loop, if no flowrate from the fourth chamber 32D towards the outlet line 27 is needed. A recycle valve 59 is provided along the recycle line 57. The recycle valve 59 selectively opens and closes the recycle line 57 according to needs and depending upon the operating conditions. Additionally, a cooler 61 can be provided along the recycle line 57 to cool fluid circulating therein, thus preventing overheating thereof. A further valve 60 can be positioned between the duct 55 and outlet line 27. With this arrangement, gas in chamber 32D can be selectively processed and delivered to outlet line 27 (with recycle valve 59 closed and valve 60 open), or recirculated in recycle line 57 (by closing valve 60 and opening recycle valve 59).

While FIGS. 1 and 2 show a two-cylinder reciprocating compressor 26, a different number of reciprocating compressor cylinders and relevant stages can be provided, for instance one, three or more cylinders, with or without intercooling. In general, at least one reciprocating compressor stage can be used for processing sealing gas from the primary vents of the dry gas seals 7, as well as for boosting the pressure of sealing gas in the sealing gas feed circuit 9.

Various operating conditions of the sealing gas vent recovery system 21 described above will be discussed in detail below. The values of various parameters (such as pressure, temperature and flowrate) referred to below are provided for a better understanding of the compressor arrangement function, are by way of example only, and shall not be construed as limiting the present disclosure.

As mentioned, when the main compressor 3 is non-operative, sealing gas shall nevertheless be continuously delivered to the dry gas seals 7, to prevent contamination thereof and avoid serious damages to the dry gas seals 7 at main compressor start-up. The sealing gas flowrate at standstill is usually smaller than in full operation, since the shaft of the main compressor 3 is stationary and therefore the dry gas seals 7 are non-rotating. As no pressurized process gas is made available by the main compressor 3 at standstill, the sealing gas vent recovery system 21 is used to boost the pressure of the sealing gas delivered by the sealing gas feed circuit 9 to the dry gas seals 7.

More specifically, one or some of the compression chambers 32A-32D are used to pressurize sealing gas vented from the dry gas seals 7 and return the vented sealing gas to the sealing gas feed circuit 9 or to the suction side 3S of the main compressor 3. At the same time, one or some of the compression chambers 32A-32D are used to boost the pressure of sealing gas in the sealing gas feed circuit 9.

In the exemplary embodiment of FIG. 2, the two compression chambers 32A, 32B of the first compressor cylinder 26A and one (chamber 32C) of the two compression chambers 32C, 32D of the second compressor cylinder 26B are used to recover sealing gas from the primary vents of the dry gas seals 7 and return the vented sealing gas to the sealing gas feed circuit 9 at a suitable pressure. At the same time, the compression chamber 32D of the second compressor cylinder 26B is used to boost the sealing gas pressure from the sealing gas feed circuit 9.

In practice, during standstill of the main compressor 3, the auxiliary compressor unit 25 receives sealing gas venting from the dry gas seals 7 at a nearly ambient pressure (e.g. between about 1 barA and about 1.5 barA) from the accumulation volume 23, and further receives an additional flow of sealing gas at a higher pressure from the second gas inlet 29. Both sealing gas flows are pressurized at substantially the same pressure and returned to the sealing gas feed circuit 9 at a pressure suitable for delivery to the dry gas seals 7.

In some embodiments, and by way of non-limiting example, a sealing gas flowrate of about 10 m$^3$/h can be delivered from the second gas inlet 29 to the fourth compression chamber 32D of the auxiliary reciprocating compressor 26. The pressure is boosted at around 52 barA and the gas is returned through outlet line 27 to the sealing gas feed circuit 9 and therefrom delivered to the dry gas seals 7. In this way, the auxiliary compressor unit 25 acts as a sealing gas pressure booster during standstill of the main compressor 3. The temperature and pressure of the gas delivered through the second gas inlet 29 to the compression chamber 32D of the auxiliary compressor unit 25 depend upon the settle-out conditions in the main compressor 3. For instance, the temperature can be around 45° C. and the pressure (settle-out pressure) can be around 47.2 barA.

At the same time, a small flowrate, e.g. of around 0.36 Sm³/h at about 1.3 barA is recovered from the primary vents of the dry gas seals 7 and delivered to the accumulation volume 23 at about ambient temperature.

It shall be understood that the above pressure and flowrate values, as well any parameter value mentioned herein, are merely by way of example and that they may vary even consistently, e.g. by an order of magnitude, depending upon the configuration of the compressor arrangement.

During start-up of the main compressor 3, the auxiliary compressor unit 25 is still used to recover and pressurize the dry gas seal primary vents recovered through the primary vent recovery duct 14 and further used for boosting the pressure of the sealing gas in the sealing gas feed circuit 9, until the gas pressure at the delivery side 3D of the main compressor 3 is sufficiently high to provide sealing gas for the sealing gas feed circuit 9 at the proper pressure, without requiring further pressure boosting by the auxiliary compressor unit 25. In the exemplary embodiment of FIG. 2, the sealing gas pressure boosting function is again performed by the fourth compression chamber 32D of the auxiliary reciprocating compressor 26, while the remaining compression chambers 32A, 32B and 32C process the spent sealing gas from the primary vent recovery duct 14.

In these operating conditions, the sealing gas pressure in outlet line 27 can be about 52 barA at a flowrate of about 10 m³/h. The temperature of process gas from the second gas inlet 29 can be about 23.5° C. at a pressure of about 47 barA. Since in this step the main compressor shaft as well as the dry gas seals 7 are rotating at increasing rotary speed, the primary vent flowrate increases from about 2.352 Sm³/h to about 3.36 Sm³/h, for instance, and may have a pressure of between about 1.3 barA and about 1.5 barA.

At rated operating conditions (main compressor 3 at normal running speed) the delivery pressure at the delivery side 3D of the main compressor 3 can be around 64 barA. Boosting the pressure of the sealing gas through the auxiliary compressor unit 25 is not required anymore, such that the flowrate through the second gas inlet 29 will be about 0 m³/h. A flow of spent sealing gas from the primary vent recovery duct 14 at a pressure ranging between about 1.3 and 1.5 barA will be recovered through accumulation volume 23 and auxiliary compressor unit 25. By way of example, the primary vent flowrate can range from about 2.352 Sm³/h at around 1.3 barA, to about 3.36 Sm³/h at around 1.5 barA.

Since the sealing gas pressure boosting function of compression chamber 32D is not required when the main compressor 3 is at rated operating conditions, the recycle valve 59, which is maintained closed during the standstill or start-up conditions, will open to allow full recirculation through recycle line 57 of the gas contained in the fourth compression chamber 32D. Valve 60 prevents the gas delivered from compression chamber 32D to enter outlet line 27. Cooler 61 prevents overheating of the recirculating gas.

In order to automatically cause the auxiliary compressor unit 25 to operate as a sealing gas pressure booster during standstill or during start-up or shut-down transients of main compressor 3, a valve 65 (see FIG. 1) can be arranged in the sealing gas feed circuit 9, between a point of connection 29A of the second gas inlet 29 to the sealing gas feed circuit 9, and the point of connection 27A of the outlet line 27 to the sealing gas feed circuit 9. The valve 65 can be a controlled valve, or a pre-loaded valve, for example. When sufficient pressure is available on the delivery side 3D of the main compressor 3, the valve 65 opens and sealing gas flows through the valve towards the dry gas seals 7, without entering the auxiliary compressor unit 25 through the second gas inlet 29. Conversely, if insufficient pressure is available at the delivery side 3D of the main compressor 3, such as at standstill or start-up of main compressor 3, valve 65 closes and sealing gas flows from the delivery side 3D of the main compressor 3 into the auxiliary compressor unit 25 through the second gas inlet 29 and returns to the sealing gas feed circuit 9 through outlet line 27 after pressure boosting. Valve 65 prevents backflow of sealing gas from output line 27 to inlet line 29.

In rated operating conditions, the sealing gas flowrate entering the sealing gas feed circuit 9 from the delivery side 3D of the main compressor 3 at high pressure (around 64 barA in the above-mentioned exemplary embodiment), is usually laminated to reach the pressure suitable for feeding to the dry gas seals 7. The pressure drop by lamination represents a loss of energy. In some embodiments, when the main compressor 3 operates under rated operating conditions, the sealing gas can be processed through the compression chamber 32D operating this latter in an expander mode, causing the sealing gas entering the auxiliary compressor unit 25 through the second gas inlet 29 to expand and generate useful mechanical energy, which can be used to compress the recovered vented sealing gas processed in compression chambers 32A, 32B, 32C If the power generated by expansion of the sealing gas in compression chamber 32D, operating in expander mode, is higher than the power required to compress the recovered sealing gas in compression chambers 32A, 32B and 32C, the electric motor driving the reciprocating compressor 26 can be operated in a generator mode, and the electric energy generated thereby can be distributed on an electric power distribution grid (not shown).

Under these conditions, a sealing gas flowrate of about 10 m³/h at about 64 barA and about 45.9° C. can expand to 50.3 barA through the chamber 32D and be returned to the sealing gas feed circuit 9 through outlet line 27 along with the sealing gas recovered through the primary vent recovery duct 14 and processed through compression chambers 32A, 32B and 32C of the auxiliary reciprocating compressor 26.

Figure 3:
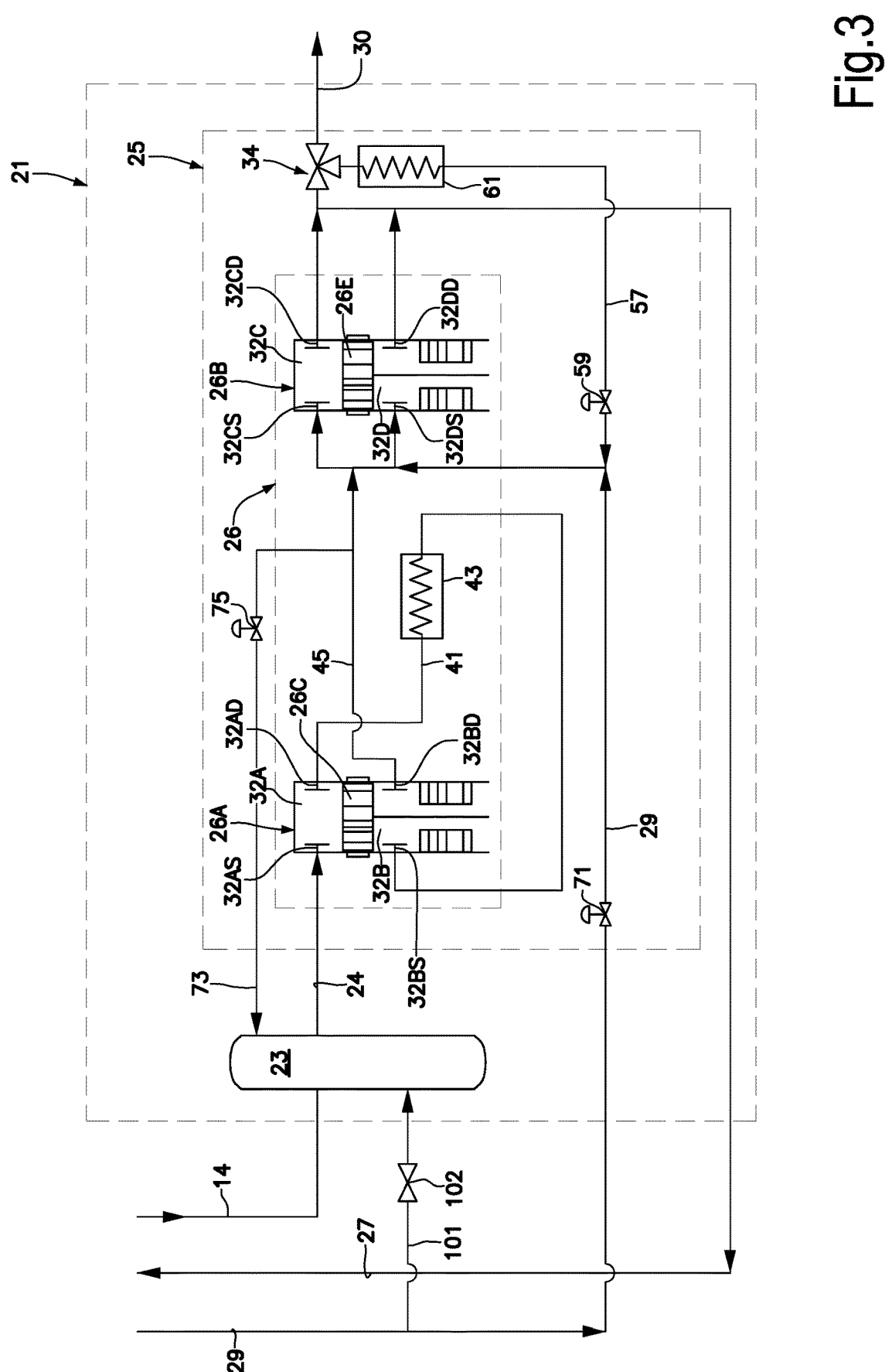
FIG. 3 illustrates a diagram of the auxiliary compressor unit in a further embodiment.

With continuing reference to FIG. 1, FIG. 3 shows a further embodiment of the sealing gas vent recovery system 21. The sealing gas vent recovery system 21 of FIG. 3 can be connected to the main compressor 3 and to the sealing gas feed circuit 9 as shown in FIG. 1. In FIG. 3 the same or equivalent elements already shown in FIG. 2 and described above are designated with the same reference numbers and are not described again in detail.

The sealing gas vent recovery system 21 of FIG. 3 differs from the sealing gas vent recovery system 21 of FIG. 2 mainly in view of the connections of the second compressor cylinder 26B to the remaining of the auxiliary compressor unit 25. More in detail, in the embodiment of FIG. 3 the suction sides 32CS and 32DS of the third compression chamber 32C and of the fourth compression chamber 32D are connected to one another. Similarly, the delivery sides 32CD and 32DD of the compression chambers 32C and 32D are connected to one another, such that the two compression chambers 32C and 32D operate in parallel.

As will become clear from the description of the operation of the auxiliary compressor unit 25 of FIG. 3, in this embodiment c compression chambers 32A, 32B are part of a compressor section adapted to pressurize sealing gas vented from the dry gas seals 7, while compression chambers 32C and 32D are configured to pressurize both the sealing gas vented from the dry gas seals 7 and boost the pressure of the sealing gas from the sealing gas feed circuit 9 when the main compressor 3 is at standstill or during start-up or shut-down transients thereof.

Sealing gas entering the auxiliary compressor unit 25 through the second gas inlet 29 is mixed with the flow delivered by the second compression chamber 32B of the first compressor cylinder 26A. Similarly, compressed sealing gas delivered by both the third compression chamber 32C and the fourth chamber 32D of the second compressor cylinder 26B are merged and delivered through outlet line 27 to the sealing gas feed circuit 9. A recycle line 57 with a recycle valve 59 and a cooler 61 can be provided to recirculate gas in the second compressor cylinder 26B.

Moreover, a depressurization valve 71 is installed along the second gas inlet 29 for the purposes which will be explained below. Finally, a return line 73 can place the delivery side 32BD of the second compression chamber 32B into fluid communication with the accumulation volume 23. A pressure control valve 75 can be located along return line 73 to selectively open and close the return line 73.

Operation of the auxiliary compressor unit 25 of FIG. 3 is as follows. The parameter values outlined below are by way of example only, and shall not be construed as limiting the present disclosure.

Under standstill conditions of the main compressor 3, sealing gas from the second gas inlet 29 enters the auxiliary compressor unit 25 at a reduced flowrate of, for instance, about 10 m$^3$/h and at a pressure and temperature which depend upon the settle-out conditions, for instance, about 47 barA and 45.9° C. The primary vents of the dry gas seals 7 generate a flowrate of about 0.36 Sm$^3$/h at a pressure of around 1.3 barA.

The delivery pressure of the first compressor cylinder 26A can be around 18 bar. Thus, the pressure of the sealing gas delivered to the auxiliary compressor unit through the second gas inlet 29 shall be reduced by lamination through depressurization valve 71 from about 47 barA to about 18 barA.

The delivery pressure of the second compressor cylinder 26B can be about 52.2 barA.

At start-up, the flowrate of the vented sealing gas from the dry gas seals 7 can range from about 2.352 Sm$^3$/h at a pressure of about 1.3 barA, to about 3.36 Sm$^3$/h at a pressure of about 1.5 barA, depending upon the rotary speed of the main compressor 3. The sealing gas entering the auxiliary compressor unit 25 along the second gas inlet 29 can have a pressure of about 47 barA, a flowrate of about 10 m$^3$/h and a temperature of about 23.5° C. The flowrate in outlet line 27 is about 10 m$^3$/h at about 52 barA.

When rated operating conditions are achieved, the flowrate in the second gas inlet 29 will be about zero and the flowrate of vented sealing gas from the dry gas seals 7 entering the accumulation volume 23 will range between about 2.352 Sm$^3$/at 1.3 barA and about 3.36 Sm$^3$/h at 1.5 bar. In this embodiment valve 65 will remain closed during normal operating conditions and the entire sealing gas will be processed through the auxiliary reciprocating compressor 26. Valve 65 can be an on-off valve, which will be opened only in case of auxiliary compressor 26 failure.

While in the exemplary embodiments disclosed above boosting of the pressure of the sealing gas from the sealing gas feed circuit 9 during standstill is provided by the second compressor cylinder 26B, in further embodiments (not shown) the first compressor cylinder 26A can be used for boosting the pressure in the sealing gas feed circuit 9.

Figure 4:
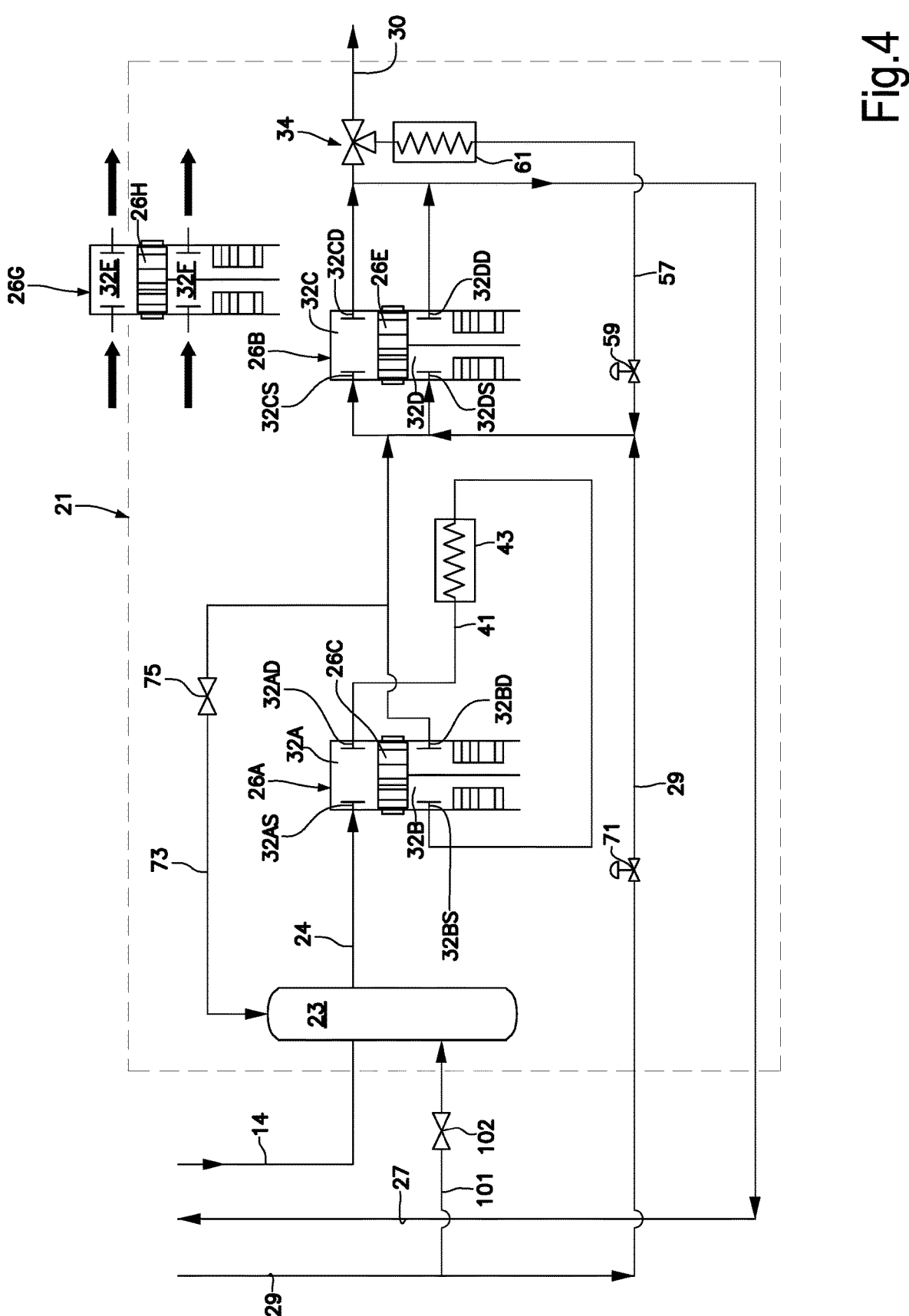
FIG. 4 illustrates a diagram of the auxiliary compressor unit in a yet further embodiment.

In further embodiments, the auxiliary compressor 26 may include one or more additional stages operating in compressor or expander mode. By way of example, FIG. 4 illustrates a diagram of a further embodiment of the auxiliary compressor unit 25, including an additional reciprocating machine stage operating as an expander. In FIG. 4 the same reference numbers are used to designate the same elements and components shown in FIG. 3 and which will not be described again.

In FIG. 4 the reciprocating compressor 26 comprises a third compressor cylinder 26G, including a piston 26H arranged for reciprocating in the cylinder 26G. The piston 26H divides the cylinder 26G in a first chamber 32E and a second chamber 32F. If a flow of compressed gas is available in the system where the compressor unit 1 is installed, said flow can be expanded in the third compressor cylinder 26C of the reciprocating compressor 26, which operates as an expander and which thus generates useful mechanical power, that can be converted into electric power via an electric machine drivingly coupled to the reciprocating compressor. Alternatively, the mechanical power generated can be used to reduce the power required by the driver of the auxiliary reciprocating compressor 26.

While in FIG. 4 the expander function is performed by a single double-acting compressor cylinder, in other embodiments (not shown), more than one compressor cylinder and/or one or more single-acting compressor cylinders can be used in an expander mode. In some embodiments, a double-acting compressor cylinder may be used both in a compressor mode (in one of the two chambers) and in an expander mode (in the other of the two chambers).

The above described embodiments, of the compressor arrangement 1 provide for a sealing gas boosting function when the main compressor 3 is at standstill or during start-up or shut-down transients. The same auxiliary compressor unit 25 providing for the boosting function, also performs the function of primary vent recovery to recover spent sealing gas from the dry gas seals 7, preventing release of the vented sealing gas in the environment.

According to further embodiments, the auxiliary compressor unit 25 can perform additional operations, such as recovering low-pressure, i.e. de-pressurized, process gas emissions from other components of the compressor arrangement 1, or from the compressor driver D. Typically, low-pressure process gas can be discharged from one or more of the following: a pneumatic starter of a gas turbine engine acting as a driver of the main compressor 3; a fuel gas heating system adapted to heat fuel gas prior to injection in the gas turbine engine. Low-pressure process gas generated by the above-mentioned components can be collected in the accumulation volume 23.

According to yet further embodiments, the auxiliary compressor unit 25 can also perform additional functions, such as removing process gas from the main compressor 3 upon shut-down thereof. Compressor shut-down may be required for maintenance, repairing or replacement operations, for instance. The process gas contained in the main compressor 3 shall be evacuated after shut-down.

Evacuation is performed by closing isolation valves 5C and 5D on inlet duct and outlet duct 5B, respectively. Once the isolation valves 5C and 5D have been closed, process gas can be removed from the interior of the main compressor 3 by activating the auxiliary compressor unit 25 and opening an on-off valve 102 in a compressor evacuation duct 101. The compressor evacuation duct 101 can be connected to the sealing gas feed circuit 9. In other embodiments, the compressor evacuation duct and relevant valve 102 can be connected directly to the delivery side 3D of the main compressor 3, upstream of the isolation valve 5D, as shown in 101X and 102X in FIG. 1. In yet other embodiments, the compressor evacuation duct and relevant valve can be connected to the suction side 3S, downstream of the isolation valve 5C, as shown in FIG. 1 at 101Y and 102Y.

Once the evacuation duct 101 (or 101X or 101Y) is open, the auxiliary compressor 26 can pump process gas out of the main compressor 3 and deliver the evacuated process gas in the inlet duct 5A upstream of the isolation valve 5C, or in the outlet duct 5B downstream of the isolation valve 5D. The first option is preferred, as the auxiliary compressor 26 can be run at a lower compression ratio. The pressurized evacuated process gas is delivered to the inlet duct 5A through connection line 30. The process gas evacuation ends when a pre-set pressure value inside the main compressor 3 has been achieved, whereafter the main compressor 3 can be opened.

In the embodiments disclosed so far, the auxiliary compressor unit 25 is adapted to perform selectively or in combination, as the case may be: a sealing gas pressure boosting function during standstill and/or start-up or shut-down transients of the main compressor 3; sealing gas primary vent recovery from the dry gas seals 7; evacuation of process gas from the main compressor 3 upon compressor shut-down. In other embodiments, the auxiliary compressor unit 25 may be configured to perform only the sealing gas pressure boosting function during standstill and/or start-up and shut-down transients of the main compressor 3, and evacuation of the process gas from the main compressor 3 upon shut-down, or else recovery of vented sealing gas from the dry gas seals 7. In both instances, the auxiliary compressor unit 25 performs the sealing gas pressure boosting function and function of recovery of process gas from the main compressor 3.

Figure 6:
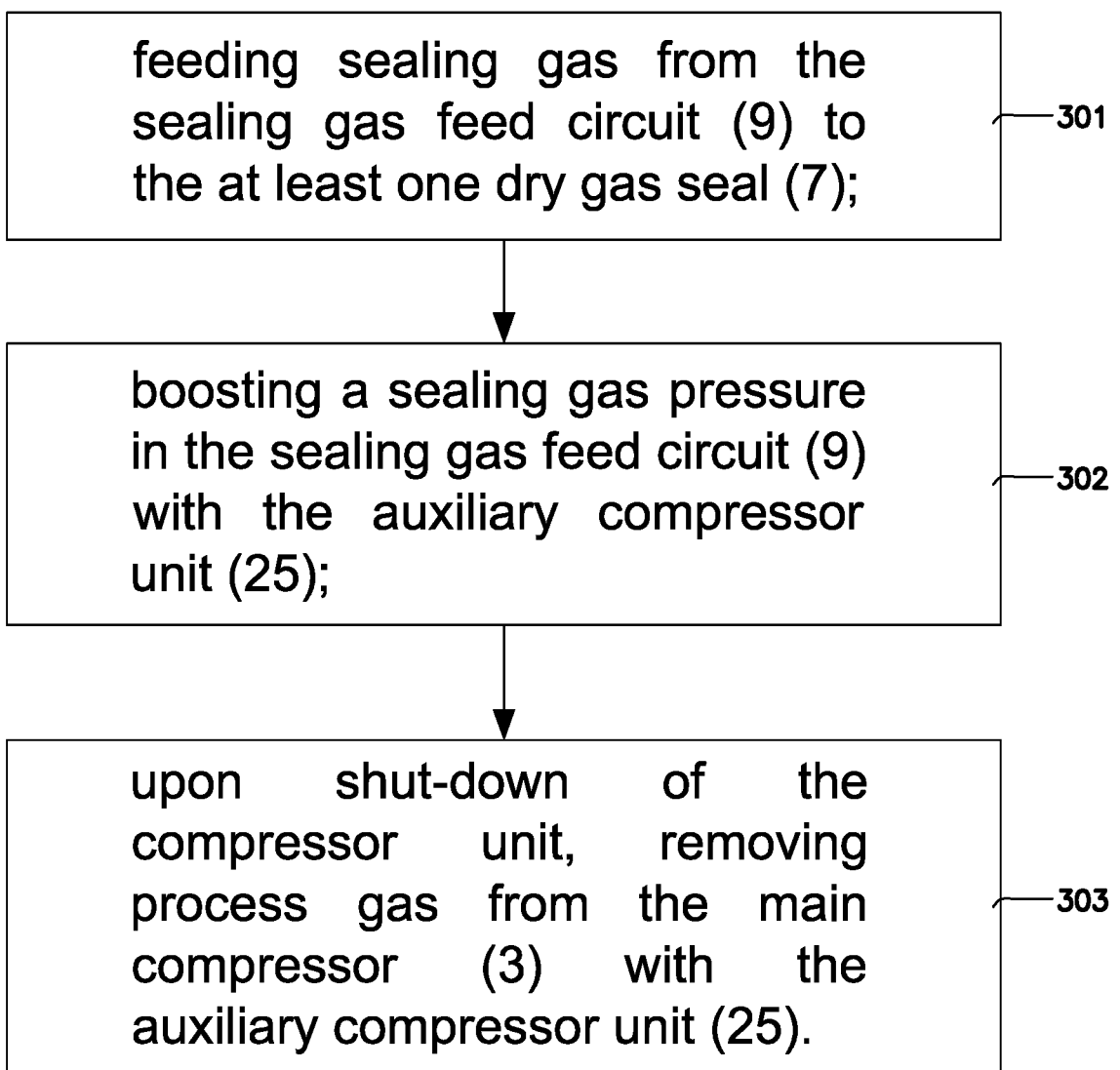

FIGS. 5 and 6 illustrate flowcharts of methods of operating the compressor arrangements 1 described so far.

More specifically, FIG. 5 illustrates a method of operating the compressor arrangement 1, wherein the auxiliary compressor unit 25 is used to recover vented sealing gas from the dry gas seals 7 and as a booster for boosting the pressure of the sealing gas in the sealing gas feed circuit 9 when insufficient pressure is available at the delivery side 3D of the main compressor 3. The method comprises a step 201 of feeding sealing gas from the sealing gas feed circuit 9 to the dry gas seals 7 of the main compressor 3. Sealing gas vented at low pressure from the dry gas seals 7 is recovered at step 202 and pressurized by means of the auxiliary compressor unit 25 (step 203), such that it can be returned to the dry gas seals 7 through the sealing gas feed circuit 9 or to the main compressor 3. The method of FIG. 5 further comprises the step of boosting sealing gas pressure in the sealing gas feed circuit 9, e.g. at standstill of the main compressor 3 or during start-up or shut-down transient (step 204).

FIG. 6 illustrates a method of operating the compressor arrangement 1, wherein the auxiliary compressor unit 25 is used to boost the sealing gas pressure in the sealing gas feed circuit 9 when insufficient pressure is available at the delivery side 3D of the main compressor 3, and to remove process gas from the main compressor 3 in case of compressor shut down. The method of FIG. 6 comprises a step (step 301) of feeding sealing gas from the sealing gas feed 9 circuit to the dry gas seals 7 of the main compressor 3, and a step of boosting the sealing gas pressure in the sealing gas feed circuit 9 e.g. during standstill of the mean compressor 3 or whenever needed (shut-down or start-up transient), step 302. The method further comprises a step of removing process gas from the main compressor 3, e.g. following shut-down (step 303).

It shall be understood that the two methods summarized in the flow charts of FIGS. 5 and 6 can both be performed by the same auxiliary compressor unit 25.

Exemplary embodiments have been disclosed above and illustrated in the accompanying drawings. It will be understood by those skilled in the art that various changes, omissions and additions may be made to that which is specifically disclosed herein without departing from the scope of the invention as defined in the following claims.

The invention claimed is:

1. A compressor arrangement, comprising:
   a main compressor having a suction side, a delivery side, and dry gas seals;
   a sealing gas feed circuit adapted to receive sealing gas from the delivery side of the main compressor and feed sealing gas to the dry gas seals; and
   an auxiliary compressor including a sealing gas inlet and a sealing gas outlet, the sealing gas inlet and the sealing gas outlet fluidly coupled to the sealing gas feed circuit,
   wherein the auxiliary compressor is adapted to boost pressure of sealing gas in the sealing gas feed circuit, and
   wherein the auxiliary compressor is adapted to receive gas flow from the main compressor.

2. The compressor arrangement of claim 1, wherein the auxiliary compressor comprises:
   a first compressor section adapted to receive sealing gas from the sealing gas feed circuit at a sealing gas inlet pressure and to return sealing gas to the sealing gas feed circuit at a sealing gas outlet pressure that is higher than the sealing gas inlet pressure.

3. The compressor arrangement of claim 1, wherein the auxiliary compressor comprises:
   a first compressor section with a delivery side and a suction side, and
   a recycle line that couples the delivery side and the suction side.

4. The compressor arrangement of claim 1, wherein the auxiliary compressor is adapted to remove process gas from the main compressor after shut-down of the main compressor to depressurize the main compressor.

5. The compressor arrangement of claim 1, further comprising:
   a primary vent recovery duct coupled to the dry gas seals, wherein the primary vent recovery duct is adapted to recover sealing gas vented from the dry gas seals and feed sealing gas to the auxiliary compressor.

6. The compressor arrangement of claim 1, further comprising:
   a primary vent recovery duct coupled to the dry gas seals, wherein the auxiliary compressor is adapted to pressurize sealing gas and feed sealing gas to the sealing gas feed circuit.

7. The compressor arrangement of claim 1, wherein the auxiliary compressor comprises a reciprocating compressor.

8. The compressor arrangement of claim 1, wherein the auxiliary compressor comprises a multistage reciprocating compressor.

9. The compressor arrangement of claim 1, wherein the auxiliary compressor comprises a double-acting compressor cylinder.

10. The compressor arrangement of claim 9, further comprising:

a duct coupled to the double-acting compressor cylinder and to the sealing gas feed circuit, wherein the double-acting compressor cylinder is adapted to boost pressure of sealing gas from the sealing gas feed circuit.

11. The compressor arrangement of claim 1, wherein the auxiliary compressor comprises a cylinder adapted to receive seal gas from the sealing gas feed circuit and expand the seal gas.

12. The compressor arrangement of claim 1, further comprising:

an accumulation volume coupled to the main compressor and the auxiliary compressor, wherein the accumulation volume is adapted to receive gas flow from the main compressor.

13. The compressor arrangement of claim 1, further comprising:

an accumulation volume;

a return line coupled to the accumulation volume; and a delivery duct coupled to the accumulation volume; and.

14. The compressor arrangement of claim 1, wherein the auxiliary compressor comprises a stage configured to expand a flow of sealing gas entering the sealing gas feed circuit prior to delivering the sealing gas to the dry gas seals.

15. The compressor arrangement of claim 1, wherein the auxiliary compressor comprises a first compressor section and wherein the auxiliary compressor comprises a second compressor section.

16. The compressor arrangement of claim 1, wherein the auxiliary compressor comprises a first compressor section, a second compressor section, and a duct adapted to deliver gas flow from the main compressor to the second compressor section.

17. The compressor arrangement of claim 1, further comprising:

a primary vent recovery duct coupled to the dry gas seals, wherein the primary vent recovery duct is adapted to recover sealing gas vented from the dry gas seals and feed the sealing gas to the auxiliary compressor, and wherein the auxiliary compressor unit is adapted to pressurize the recovered sealing gas and return the pressurized recovered sealing gas towards the main compressor.

18. A compressor train comprising the compressor arrangement of claim 1.

19. A compressor train comprising the compressor arrangement of claim 1 and a driver coupled to the main compressor.

* * * * *